United States Patent [19]

Ziese

[11] Patent Number: 4,471,473
[45] Date of Patent: Sep. 11, 1984

[54] DIRECTION FINDING CIRCUIT ARRANGEMENT

[75] Inventor: Rolf Ziese, Bremen, Fed. Rep. of Germany

[73] Assignee: Fried. Krupp Gesellschaft mit beschränkter Haftung, Essen, Fed. Rep. of Germany

[21] Appl. No.: 348,157

[22] Filed: Feb. 11, 1982

[30] Foreign Application Priority Data

Feb. 12, 1981 [DE] Fed. Rep. of Germany ....... 3104993

[51] Int. Cl.$^3$ .......................... G01S 7/52; G01S 15/06
[52] U.S. Cl. ...................................... 367/92; 367/103
[58] Field of Search .................. 367/92, 101, 102, 103

[56] References Cited

U.S. PATENT DOCUMENTS

| | | | |
|---|---|---|---|
| 2,994,060 | 7/1961 | Ross | 367/101 |
| 3,419,845 | 12/1968 | Thiede et al. | 367/103 |
| 3,824,531 | 7/1974 | Walsh | 367/92 |
| 4,253,166 | 2/1981 | Johnson | 367/92 |

OTHER PUBLICATIONS

Berktay, J. Sound Vib., vol. 6, No. 2, 1967, pp. 244–254; 367/92.

Primary Examiner—Richard A. Farley
Attorney, Agent, or Firm—Spencer & Frank

[57] ABSTRACT

A sonic energy scanning apparatus in which two directional primary sonic energy beams at two different frequencies are radiated into a medium capable of producing nonlinear acoustic effects to produce a third sonic energy beam having a given directional characteristic and a frequency equal to the difference between the frequencies of the primary beams. Scanning with the third beam is effected by varying the direction of the axes of, and the frequency difference between, the two primary beams in discrete steps for correspondingly varying the direction of the axis of the third beam over a selected angular sector and the frequency of the third beam such that each direction of the third beam axis is associated with a respectively different frequency, and by identifying the direction to a source of echoes of the third beam by determining the frequency of such echoes.

10 Claims, 7 Drawing Figures

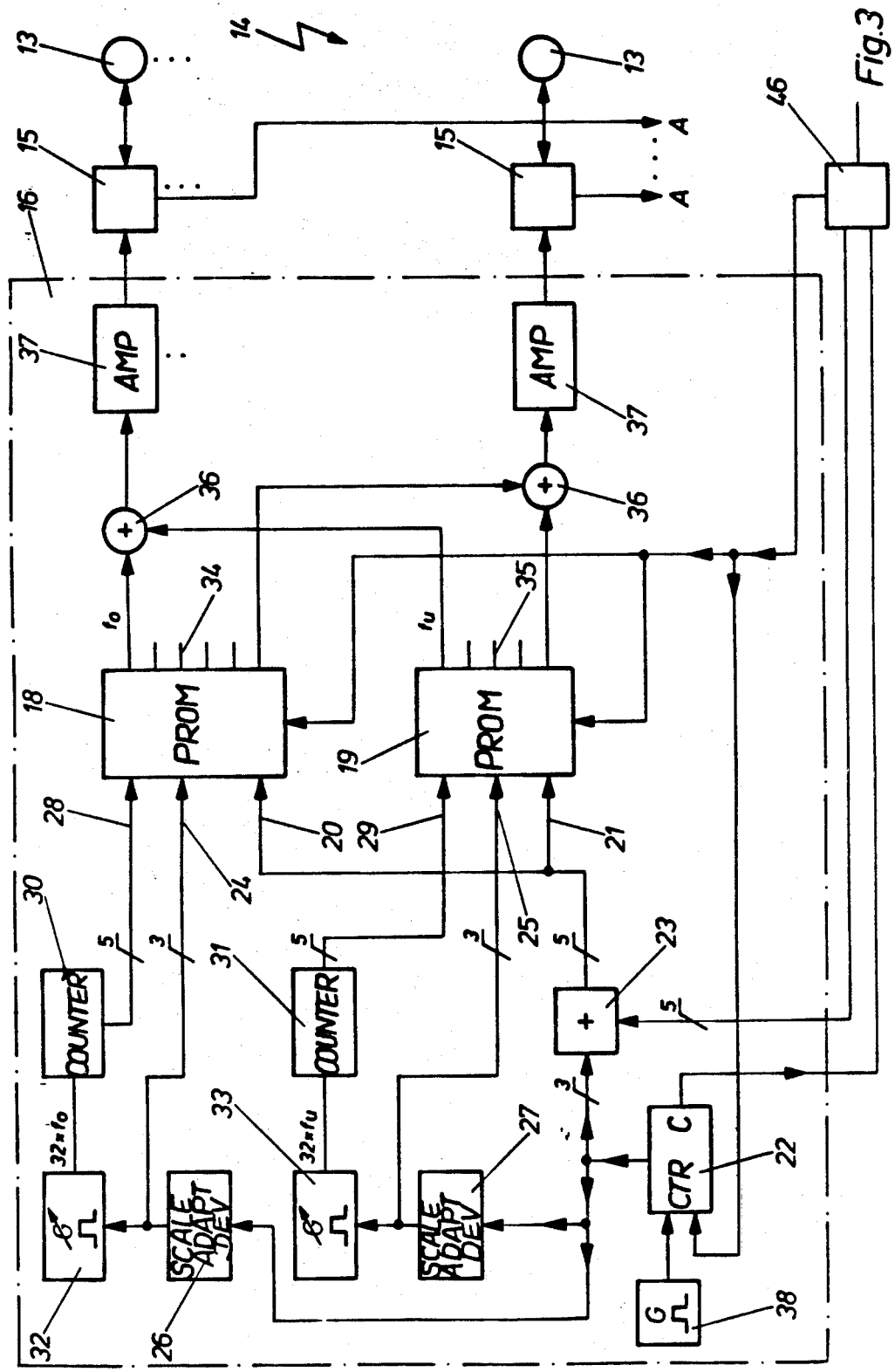

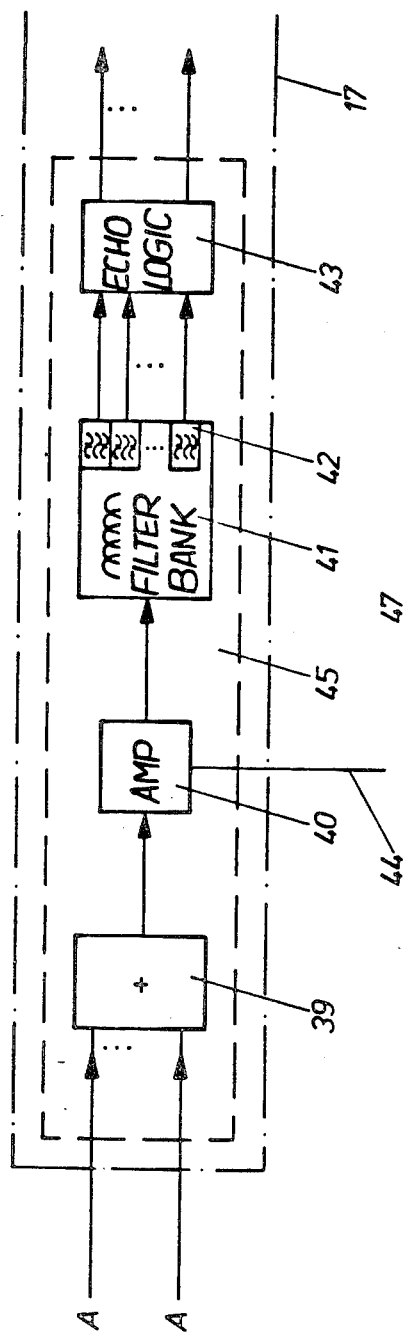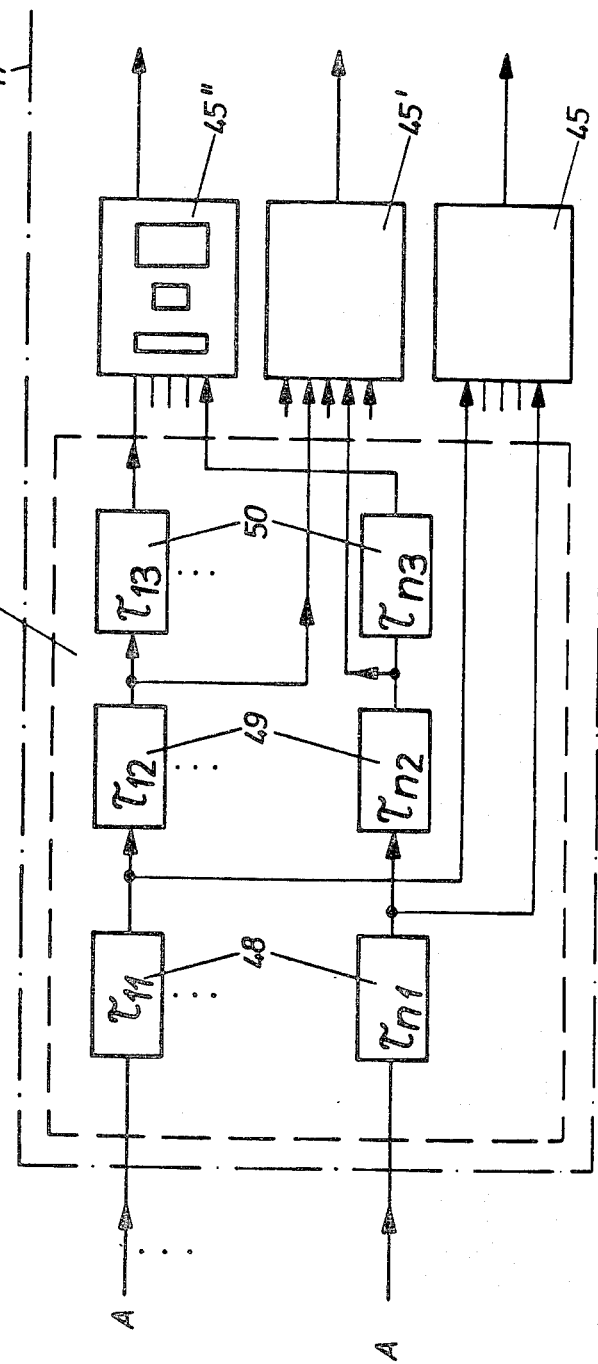

DIRECTION FINDING CIRCUIT ARRANGEMENT

BACKGROUND OF THE INVENTION

The present invention relates to a direction finding system in which two primary sonic energy beams having respectively different frequencies generate a third beam at a frequency equal to the difference between the first two beam frequencies.

Such a system, which operates according to the so-called parametric principle, has the advantage that, with a relatively small transmitting area, it achieves a high transmission directivity with small ancillary lobes. The low difference frequency resulting from the frequencies of the two primary beams experiences smaller attenuation in the propagation direction so that good ranges can be realized. Moreover, the lower difference frequency beam can penetrate certain media better than the higher frequency primary beams.

In a known method of this type which is utilized, for example, to scan the bottom of a harbor, and is described in U.S. Pat. No. 3,824,531, the direction of the third sonic beam at the lower difference frequency resulting from the two primary beams is varied in that the directivity pattern of the first and second beams are electrically pivoted in a known manner and the echo signals which are received with no directional receiving characteristic by the receiving transducers are pre-equalized with respect to their direction.

Although this method is well suited for surveying a harbor where the water is of shallow depth, it is not suitable for surveying, for example, the bottom of the ocean in deep sea regions where depths up to 5000 m are not uncommon.

When scanning the bottom of the ocean with the prior art method, an ocean depth of 5000 m would require a period of time of about 6.6 seconds between the transmission of the sounding beam and the receipt of the bottom echo, this time period being determined by the depth of the ocean and the speed of sound in water. The scanning direction can thus be changed only about every 7 seconds.

The time required to scan a strip of bottom transversely to the direction of travel of the surveyor ship in, for example, 24 angularly offset directions would thus be 168 seconds. With a traveling speed of 4 knots for the surveyor ship, the ship will already have changed its position by about 340 m during that time. If thus, for mapping purposes, the bottom of the ocean is to be accurately surveyed with the prior art method, this requires an extremely slow travel of the surveyor ship; this makes the surveying task slow and also expensive.

SUMMARY OF THE INVENTION

It is an object of the present invention to provide a system of the above-mentioned type which, while maintaining good resolution, permits a significantly greater operating speed during sounding or scanning of a given area, such as the ocean, a region of the ocean bottom, or the like, thereby providing, compared to the prior art method, a significant time advantage in obtaining location finding and surveying results.

The above and other objects are achieved, according to the invention, by the provision of a direction finding system whose operation includes radiating two directional primary sonic energy beams at two different frequencies into a medium capable of producing nonlinear acoustic effects to produce a third sonic energy beam having a given directional characteristic and a frequency equal to the difference between the frequencies of the primary beams, varying the direction of the axes of, and the frequency difference between, the two primary beams in discrete steps for correspondingly varying the direction of the axis of the third beam over a selected angular section and the frequency of the third beam such that each direction of the third beam axis is associated with a respectively different frequency, and identifying the direction to a source of echoes of the third beam by determining the frequency of such echoes.

The system according to the invention is composed of a circuit arrangement which includes transmitting means composed of: two memories each associated with a respective primary beam and each having a plurality of outputs, each connected to a respective transducer unit, first address inputs connected to receive information identifying the direction of its associated primary beam, second address inputs connected to receive information identifying the frequency of the sonic energy of its associated primary beam, a plurality of adjacent clock signal inputs connected to receive respective clock pulse trains such that the frequency of the clock pulse train at one clock signal input is equal to the associated sonic energy frequency and the frequencies of the clock pulse train at the other clock signal inputs differ by a factor of 2 from one clock signal input to the next, each memory being constructed to provide at its outputs signals at the frequency of the sonic energy of its associated beam and with a constant phase relation between adjacent outputs corresponding to the information supplied to the address inputs and determining the direction of the main axis of the associated beam; and control means connected to the address and clock signal inputs of the memories for supplying thereto information and clock pulse signals causing the direction of the main axes, and the frequency difference between, the two primary beams to vary in discrete steps for correspondingly varying the direction of the axis of the third beam over at least one selected angular sector and the frequency of the third beam such that each direction of the third beam axis is associated with a respectively different frequency.

In the operation of the system according to the invention, the sounding beams are transmitted in succession at a frequency associated with a sounding direction or a sounding angle. If, for example, the transmission period of the sounding beam is 2 ms, there results, with 24 transmitted beams at 24 different frequencies corresponding to 24 different radiation directions offset by angular steps, a period of 24·2 ms+6.66 s=about 6.7 seconds from the moment of transmission of the first sounding beam until the arrival of the echo originating from the last, i.e., the 24th sounding beam, assuming the depth remains the same at 5000 m. This time period is hardly greater than the total delay time determined by the speed of sound in water and the distance. Again assuming a ship travel speed of 4 knots, from one sounding or scanning transmission to the next, the ship will thus have changed its position only by 13.5 m in the forward direction, a negligibly small amount.

Since each transmitting direction has its own assigned frequency, a determination of the frequency of the received echoes permits detection of the exact position of the objects or bottom surfaces producing the echoes. Compared to the prior art method, the method according to the invention thus has the advantage that with approximately the same quality of resolution, it permits a significantly higher scanning speed. As explained above, with the same angular range transversely to the direction of travel of the ship, the scanning speed in a sounding operation according to the present invention is about 6.7 seconds rather than 168 seconds as in the above-described prior art method. The operating speed, e.g. the speed of the surveying ship, can thus be considerably greater than with the prior art methods.

This is also of advantage if the process according to the invention is used, not for measuring depth, but for scanning a sea area lying in the forward direction of the ship and transversely to the ship. Scanning by emitting the sound in a relatively flat manner, i.e. when emitting sound at a relatively small angle with respect to the forward direction of the ship, also requires that the system have a far range. However, in this case errors resulting from the movement of the ship itself are much more serious because the ship moves toward the area to be scanned, and changes in location of the order of magnitude occurring in prior art methods result in considerable angular errors in the determination of the direction of the sounded objects.

According to an advantageous embodiment of the invention the two primary signal frequencies are shifted in value in respectively opposite directions after every transmission step. This is of particular advantage if a frequency mixture of the first and second frequencies is transmitted by each transducer whereby these frequencies will then be superposed on one another in the water medium and form the difference frequency. With this measure it is possible to assure that, even within a relatively large frequency range over which the parametric frequency is varied, the adaptation of the transducers to the water medium is approximately the same at all frequencies and thus the quality of performance of the system remains approximately the same.

According to a further advantageous feature of the invention, the transient period of the filter arrangements required at the receiving end is considered and reliable evaluation of the echo frequencies becomes possible.

According to another advantageous feature of the invention, use is made of a so-called preformed beam (PFB) receiving system to make it possible to cover a receiving angle range which is equal to the given angular sector multiplied by the number of the PFB. The differently preequalized direction formers in the PFB receiving system suppress the ambiguous parts of the parametric frequencies. This PFB receiving system can be formed advantageously by means of the existing transmitting transducer arrangement, the so-called transmission base.

An advantageous circuit arrangement for implementing the method includes two programmable memories (PROM's) which make possible, with a relatively small amount of circuitry, production of a sounding beam at variable parametric frequencies in association with a given directional angle.

Further advantageous features of the circuit arrangement according to the invention contribute individually or in combination to a technically advantageous realization of the circuit arrangement.

The invention will now be explained in greater detail with the aid of the drawings.

BRIEF DESCRIPTION OF THE DRAWING

FIG. 3 is a block circuit diagram of the circuitry at the transmitting end of a direction finding circuit arrangement according to a preferred embodiment of the invention.

FIG. 4 is a block circuit diagram of the circuitry at the receiving end according to one preferred embodiment of the invention.

FIG. 5 is a block circuit diagram of a further embodiment of the circuitry at the receiving end according to the invention.

DESCRIPTION OF THE PREFERRED EMBODIMENTS

In the operation of a direction finding system according to the invention, a first sounding beam and a second sounding beam are emitted in water in a known manner at mutually different first and second frequencies. The two sounding beams are superposed in the propagation medium, water, and, due to the nonlinear acoustic transmission characteristics of water, generate, inter alia, a sounding beam at a frequency which corresponds to the difference between the first and second frequencies. This frequency is often called the parametric frequency and the known phenomenon of difference frequency formation is called the parametric principle.

The third sounding beam at the difference frequency has the same focus and the same directional characteristic as the two sounding beams having different, though rather high, frequencies. Based on these two radiated high frequencies, the transmitting base, i.e. the area of the transmitting transducers, can thus be made relatively small and at the same time it is possible to realize a high concentration of the sounding beams with low side lobe levels.

In the method described here, the directions of the two emitted sounding beams as well as their frequencies are changed in discrete angular steps or frequency stages within the desired angular sector 10 to be covered. This results in sounding beams at the difference frequencies $f_1$ to $f_8$ in FIG. 1 which propagate in respectively different directions $\phi_1$ to $\phi_8$. In each direction, a defined parametric frequency or difference frequency $f_1$ to $f_8$ is radiated which is characteristic for the respective direction $\phi_1$ to $\phi_8$.

Figure 1:
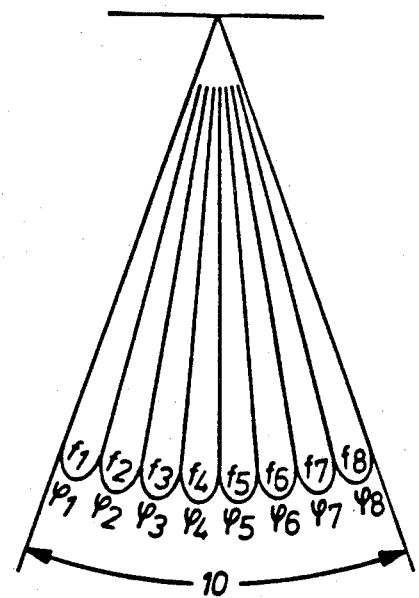
FIG. 1 is a schematic pictorial representation of the angular sector covered by the sound radiation during a transmitting process with eight different parameteric frequencies which are transmitted in mutually offset angular directions during a transmitting process.

FIG. 1 shows the array of the transmitted main or principal lobes of the different sounding beams in eight different directions offset from one another by equal angular steps. A frequency which is staggered by the same amount from the frequencies of adjacent lobes is radiated over each principal lobe. The formation of the main transmitting lobe and the pivoting of the main lobe in eight different radiation directions, i.e., the switching from one illustrated lobe to the next, is effected in a known, conventional manner.

For direction finding according to the method defined here, the echo signals produced by the transmitted sounding beams at the bottom of the ocean or at other objects are received and their frequencies are determined. Due to the fixed association of the directional angles $\phi_1$ to $\phi_8$ with the frequencies $f_1$ through $f_8$, the frequency of each echo signal will provide an accurate determination of its direction of impingement and, if required, one can determine from the angle of impingement and the travel time the location of the echo signal source, or target.

In the example illustrated in FIG. 1, the difference frequency $f_1$ of the first transmitted sounding beam on the left may be 5 kHz and the difference frequencies $f_2$ to $f_8$ of the sounding beams transmitted immediately thereafter may each be greater by increments of 0.5 kHz, i.e. $f_2$ to $f_8$ vary between values of 5.5 and 8.5 kHz. It is here advisable— but not obligatory—to change the frequencies $f_0$ and $f_u$ of the first and second sounding beams, respectively, in mutually opposite directions, each time by the same constant amount. The association of the individual angles $\phi_1$ to $\phi_8$ at which the signals at difference frequencies $f_1$ to $f_8$ are radiated, may be chosen at will and may each differ, for example, by discrete angular steps of 4°. The stepping time of the angular steps, i.e. the time from the beginning of the radiation at a first angle $\phi_n$ at a predetermined difference frequency $f_n$ until the beginning of the sound radiation at an adjacent second angle $\phi_{n+1}$ at the next difference frequency $f_{n+1}$ is preferably selected to be equal to or greater than the reciprocal of the difference $f_n - f_{n+1}$ between the parametric frequencies or the difference frequencies $f_1$ to $f_8$ associated with successive directional angles $\phi_1$ to $\phi_8$.

In order to be able to make a sweep over a transmission range which is larger than the angular sector 10, the entire angular sector 10 can additionally be pivoted through an additional angle which corresponds approximately to the opening angle $$\sum_{n=1}^{8} \phi_n$$

of the angular sector 10 or a multiple thereof. In this way, the angular sector 10 is expanded into multiplied juxtaposed angular sectors 10, 11 and 12 covering the entire desired transmitting angle range shown in FIG. 2. In each angular sector 10, 11, 12 the frequencies of the two sounding beams are changed in such a manner, as described in connection with the angular sector 10, that the parametric frequencies $f_1$ through $f_8$ are radiated at the angles $\phi_1$ to $\phi_8$ of each angular sector 10, 11 or 12.

Figure 2:
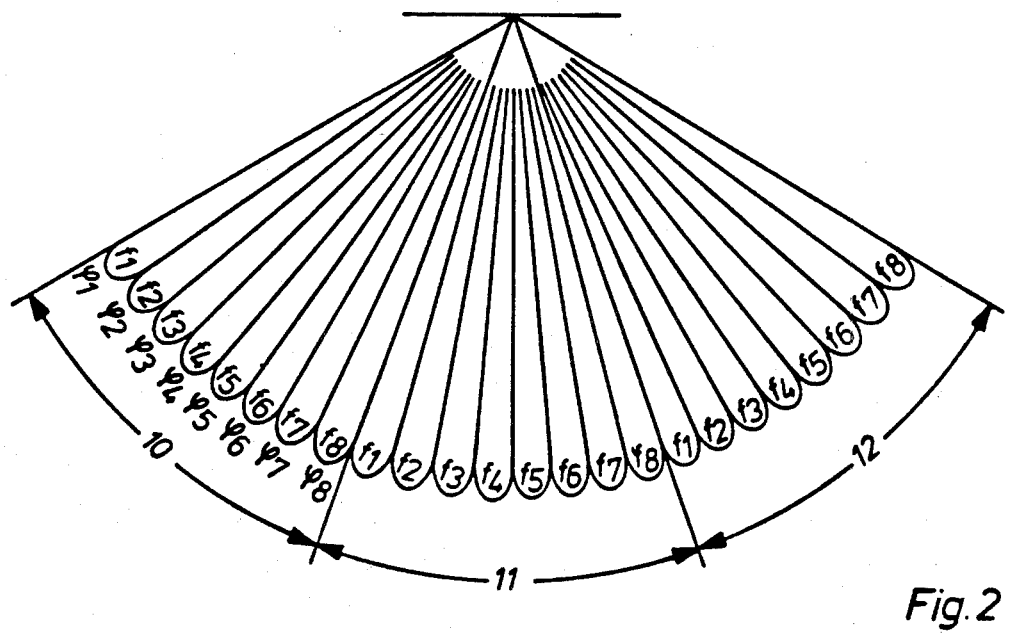
FIG. 2 is a view similar to that of FIG. 1, but with sonic energy radiation which has been modified to enlarge the area being covered.

The resulting ambiguities—for example, in the example of FIG. 2, each one of the parametric frequencies $f_1$ to $f_8$ appears at three different directional angles $\phi_1$ to 100 $_8$, which differ from one another by the angular extent of each angular sector 10, 11, 12—are suppressed by measures at the receiving end. For this purpose, a so-called preformed beam receiving system (PFB receiving system) is provided at the receiving end. This system covers a receiving angle range corresponding to the transmitting angle range by differently directionally pre-equalizing the received signals. The different directional pre-equalization is here dependent on the number of angular sectors 10 through 12 contained in the complete transmitting angle range i.e. in the illustrated example it is dependent on three angular sectors. Corresponding to these three angular sectors, the receiving angle range is covered by three receiving or principal lobes, the so-called preformed beams. One of these main lobes then covers an angular range corresponding to the angular sector 10 or 11 or 12, respectively.

Circuit arrangements for implementing the abovedescribed method are illustrated in FIGS. 3 through 5. FIG. 3 here shows the transmitter circuit portion, while FIGS. 4 and 5 show the receiver circuit portion of the circuit arrangement for a sound transmission according to FIGS. 1 and 2, respectively.

The complete circuit arrangement includes a plurality of transducers or groups of transducers 13 which are arranged on an area according to a given pattern and together form a transducer array 14. The transducer array 14 is here used as a transmitting base as well as a receiving base, with individual transducers or groups of transducers 13 being connected via separators or directional couplers 15 with the transmitting portion 16 shown in FIG. 3 as well as the receiving portion 17 shown in one of FIGS. 4 and 5. The couplers 15 connect the transducers 13 in the transmitting mode with the transmitting portion 16 and in the receiving mode with the receiving portion 17.

In FIG. 3, conductors and inputs 20, 21, 24, 25, 28 and 29, of the PROM 18, 19, the output of counter 22, and the other conductors connected to adder 23 are each associated with a numerical notation, 3 or 5, identifying the number of parallel lines forming that conductor, resp. in- or outputs i.e. the number of bits carried by that conductor.

The transmitting portion 16 includes two programmable read-only memories 18 and 19, hereinafter abbreviated as PROM 18, 19, which are suitably programmed to generate sounding beams to be radiated out over the transducer arrangement 14 at a first upper frequency $f_0$ and at a second lower frequency $f_u$, the upper and lower frequencies and simultaneously the emission angle produced by the transducer array 14, being varied in given frequency stages according to a given pattern. The known relationships between frequency, oscillation phase angle and beam directional angle are stored in the two PROMs 18, 19. These relationships are given by the equation:

$$\alpha = \frac{2\pi d}{\lambda} \cdot \sin \phi, \qquad (1)$$

where $$\lambda = \frac{c}{f} \qquad (2)$$

where $\phi$ is the beam directional angle, d the distance between two transducers or groups of transducers 13 (staves) and $\alpha$ the phase angle, in radians, between the signals at two adjacent transducers or staves.

Each PROM 18, 19 has respective first address inputs 20 or 21 to which are applied the directional angle information $\phi$. This directional angle information is furnished by a binary counter 22 which in the illustrated embodiment is designed as a 3-bit counter producing count states corresponding to the eight angular steps in the angular sector 10. Corresponding to the counting capacity of the binary counter 22, the same direction angle information can be applied to the first address inputs 20 and 21 of the PROMs 18, 19, which means that within the angular sector 10 covered by the transmitter, as shown in FIG. 1, sounding beams are emitted at different frequencies successively in eight different directions $\phi_1$ to $\phi_8$, which are angularly spaced by the same angular step, i.e. the same angular difference.

The binary counter 22 has its count input connected to a clock pulse generator 38 and the three lines of its count output connected, via a five-bit adder stage 23 to be described below, to the first address inputs 20 of PROM 18 as well as with the first address inputs 21 of PROM 19.

Each PROM 18, 19 has second address inputs 24, 25 each connected to receive the frequency information associated with the directional angle information. For this purpose, the second address inputs 24, 25 are each connected with a scale adaptation device 26 or 27, with the inputs of the two scale adaptation devices 26 and 27 being connected to the three-line count output of the binary counter 22. Each such scale adaptation device 26, 27 may be a simple memory in which the association between each directional angle $\phi$ and its associated frequency f is stored. In addition to the directional angle information applied via the binary counter 22 to the inputs of the two scale adaptation devices 26 and 27, the associated frequency information is then read out to the second address inputs 24, 25 of the two PROMs 18, 19.

Each PROM 18, 19 is additionally provided with a third multiline input 28, 29 to which clock pulse sequences can be applied in such a manner that the clock pulses at one of these inputs have the higher or lower frequency $f_0$ or $f_u$, respectively, i.e. that a clock pulse sequence at the higher frequency $f_0$ is present at one input 28 of the PROM 18 and that at the lower frequency $f_u$ is present at a corresponding input 29 of PROM 19. The clock pulse sequences at the remaining third inputs 28, 29 of the PROMs 18, 19 have frequencies which are $2^n$ greater than the one input frequency, the frequencies differing from one third input to the next by the factor 2. n is here a whole number and, in the illustrated embodiment there are five third inputs 28, 29 so that n takes on values of 1 through 5, correspondingly.

To generate these clock pulse sequences, the third inputs 28 of PROM 18 and the third inputs 29 of PROM 19 each have connected ahead of them a further binary counter 30 or 31, respectively, whose counting capacity is $2^n$. Each binary counter 30, 31 receives a counting pulse sequence whose frequency corresponds to $2^n$ times, here 32 times, the upper or lower frequency $f_0$ or $f_u$, respectively. For this purpose, each binary counter 30, 31, in the present embodiment a 5-bit counter, has its count input connected to a respective clock pulse generator 32 or 33 whose frequency is controllable.

The control input of the clock pulse generator 32 is connected to the output of the scale adaptation device 26 and the control input of the clock pulse generator 33 is connected to the output of the scale adaptation device 27. As already mentioned above, the two scale adaptation devices 26, 27 each furnish a frequency representation which is adapted to the directional angle information furnished by the binary counter 22. At the output of the scale adaptation device 26, a representation of the upper frequency $f_0$ is then furnished and at the output of the scale adaptation device 27 a representation of the lower frequency $f_u$ is furnished in association with the selected directional angle. At the output of each of the clock pulse generators 32 and 33, there is then available a clock pulse sequence having $2^n$ times the upper or lower frequency, $f_0$ or $f_u$, respectively; in the illustrated embodiment, this being 32 times the upper or lower frequency, respectively.

Each PROM 18, 19 has a number of outputs 34, 35 which correspond to the number of transducers or transducer groups (staves) 13 of the transducer arrangement 14. At each one of the outputs 34 of PROM 18 there is a pulse sequence whose frequency corresponds to the first, i.e. upper, frequency $f_0$. In the same manner, the frequency of the pulse sequences at the individual outputs 35 of PROM 19 is equal to the second, i.e. lower, frequency $f_u$. The pulse sequences at successive outputs 34, 35 of each PROM 18, 19 have a fixed phase angle difference therebetween whose magnitude is determined by the selected directional angle $\phi$ and by the transducer arrangement 14. One output 34 of the PROM 18 and a corresponding output 35 of the PROM 19 are connected with a respective mixer 36 so that a number of mixers 36 are present which correspond to the number of outputs 34 or 35, respectively or to the number of transducer groups 13. Each mixer 36 has its output connected, via a respective end amplifier 37, to one of the elements 15 and through these elements is in transmitting operation with the transducers or transducer groups 13, respectively.

The embodiment of receiving portion 17 shown in FIG. 4 includes a signal processing device 45. This device includes a summing member 39, an amplifier 40 connected in series thereto and a filter bank 41 connected to the output of the amplifier 40 and including a number of narrowband bandpass filters 42 corresponding to the number of directional angles $\phi_n$ and the number of radiated parametric frequencies $f_n$. Each bandpass filter 42 is tuned to one of the fixed parametric frequencies $f_1$ to $f_8$. The outputs of the filter bank 41 are connected to a conventional echo logic which, corresponding to the time of arrival of the echoes emits a depth or distance value representation in association with a parametric frequency $f_n$ or with a corresponding directional angle $\phi_n$. The signal processing device 45 is connected, via the directional couplers 15, to the transducers or transducer groups 13 of the transducer arrangement 14, via the lines A. The gain of the amplifier 40 can be regulated in a known manner by a regulating signal applied via the regulating input 44.

A synchronization or timing device 46, shown in FIG. 3, supplies a transmit instruction to an enable, or activating, input of the binary counter 22 and activates the two PROMs 18, 19. The transmit instruction may be produced manually or automatically, e.g. every two seconds. As soon as a control pulse appears at the carry output C of the binary counter 22, which occurs when a transmission is terminated, the synchronization device 46 activates the signal processing device 45, resets the binary counter 22 and blocks the PROMs 18,19. The synchronization device 46 comprises monoflops and/or logic elements, the connection of which is obvious from the mode of operation.

The circuit arrangement shown in FIGS. 3 and 4 and described above operates as follows:

If a transmitting pulse is to be actuated, the synchronization device 46 emits a transmit instruction. This transmit instruction activates the PROMs 18, 19 and enables, or actuates, the binary counter 22. The clock pulses from clock pulse generator 38 then advance the binary counter 22 at a clock pulse frequency which is equal to the scanning beam stepping rate, or the rate of switching between adjacent beam directions $\phi_1, \phi_2, \ldots \phi_8$, shown in FIG. 1. With the first clock pulse, information identifying the first beam axis direction $\phi_1$ is available at the first inputs 20 and 21 of the PROMs 18 and 19 and at the inputs of the two scale adaptation devices 26, 27.

Correspondingly, the scale adaptation device 26 provides information identifying the value $f_{01}$ for the upper frequency $f_0$ to the address inputs 24 of the PROM 18 and to the control input of the frequency controllable clock pulse generator 32. In a similar manner, the scale adaptation device 27 furnishes information identifying the value $f_{u1}$ for the lower frequency $f_u$ to the address inputs 25 of the PROM 19 and to the control input of the frequency controllable clock pulse generator 33. Thus generator 32 produces a clock pulse train at the frequency $32f_{01}$ and generator 33 produces a clock pulse train at the frequency $32f_{u1}$. The binary counters 30 and 31 thus advance their count states at respective rates corresponding to 32 times the frequencies $f_{01}$ and $f_{u1}$.

Clock pulses sequences whose frequencies differ from one output to the next by the factor of 2 are present at the five parallel outputs of binary counters 30 and 31. The clock sequences at the outputs of counter 30 are supplied to the five signal input lines 28 of PROM 18, while the clock sequences at the outputs of counter 31 are supplied to the five signal input lines 29 of PROM 19. Pulse sequences at the frequency $f_{01}$ appear at the outputs 34 of PROM 18 and pulse sequences at the frequency $f_{u1}$ appear at the outputs 35 of PROM 19. The individual pulse sequences at the different outputs of each PROM 18 or 19 have such a phase shift with respect to one another that the transducers or transducer groups actuated by these pulse sequences produce a beam whose directional characteristic is such that the axis of the main lobe of the beam extends in the direction $\phi_1$. In the individual mixers 36, the pulse sequences associated with the frequencies $f_{01}$ and $f_{u1}$ are each added for a respective pair of the outputs 34 and 35 of the PROMs 18 and 19 and are fed, via the associated output amplifier 37 and the element 15 to a respective transducer or transducer group 13.

Figures 6, 7:
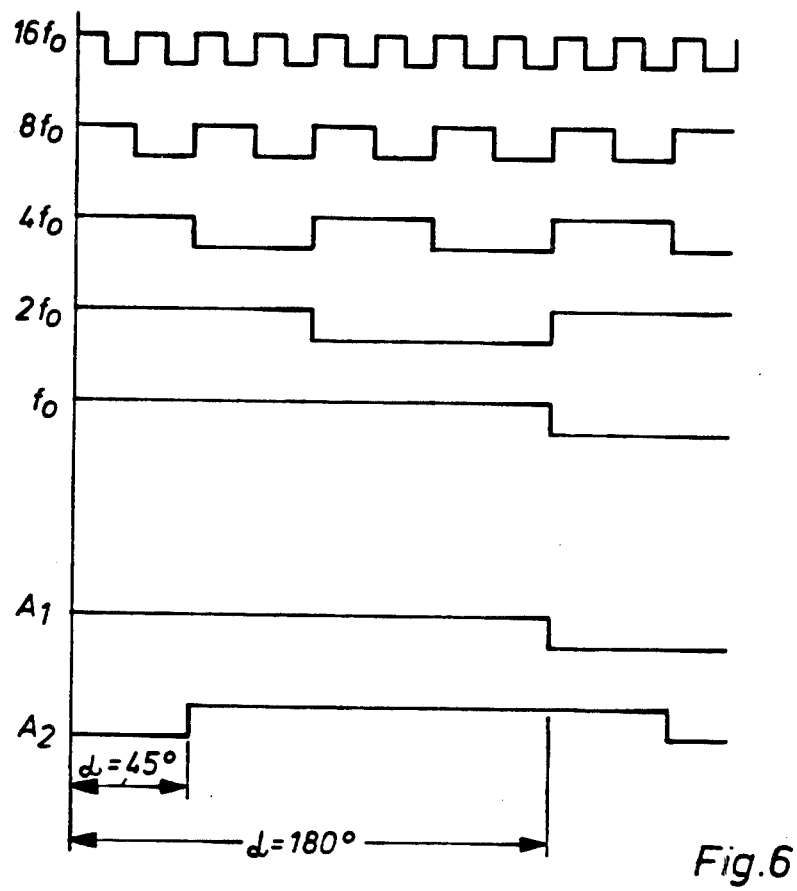
FIG. 6 is a representation of the clock pulse trains at the third multiline input 28 of the PROM 18 and of an example of a pulse sequence at two outputs of the PROM 18.
FIG. 7 is an example of a programming table for the PROM 18 for one address $f_0$ and $\phi$.

To understand the generation of the pulse sequences at the frequency $f_0$ or $f_u$ at the outputs of the PROM 18 or 19 the operation of PROM 18 will be described by means of a simple example. For the sake of simplicity, the description will be directed to only two outputs $A_1$ and $A_2$ of the outputs 34 of the PROM 18. The address-informations applied to the two address-inputs 20 and 24 of the PROM 18 are supplied as binary words. At the third multiline inputs 28 of the PROM 18 clock pulse sequences are present, as shown in FIG. 6 for a chosen frequency $f_0$. The inputs 28 are marked by $f_0$, $2f_0$, $4f_0$, $8f_0$ and $16f_0$.

It is assumed that for transmitting a primary sounding beam at the frequency $f_{03}$ in the radiation direction $\phi_3$, the transducers 13 (which are connected with the outputs $A_1$ and $A_2$ of the PROM 18) have to energize with a phase difference of $\alpha = 45°$. Then the PROM 18 has to be programmed at the addresses $\phi_3$ and $f_{03}$ as shown in FIG. 7. Thus the clock pulse sequences at the third inputs 28 of the PROM 19 produce pulse sequences at the outputs $A_1$ and $A_2$ of the PROM 18 as shown in FIG. 6 below. The pulse sequences have a frequency $f_0$ and are phase shifted against each other at a phase angle $\alpha = 45°$. As obvious from FIG. 6 the value of minimal phase angle $\alpha$ which is available amounts to 11.25°.

In principle the PROM 18—and also PROM 19—represents controlled phase shifters for each channel to the transducers or transducer groups 13 with a control unit. The control unit adjusts the electrical phase angle in the phase shifters according to the applied addresses $f_0$ and $\phi$ and to the equations (1) and (2), above. At each transducer or transducer group 13 (stave) a pulse sequence at the chosen frequency $f_0$ is applied, and the sequences of successive transducers or transducer groups 13 are shifted against each other at the phase angle $\alpha$, so that all transducers produce in known manner a sound beam with the beam directional angle $\phi$.

The transducer arrangement 14 simultaneously transmits a primary sounding beam at the frequency $f_{01}$ and a primary sounding beam at the frequency $f_{u1}$, both in the same radiation direction $\phi_1$, which beams are superposed on one another in the medium. Due to the nonlinear transmission characteristics of the medium, this results in a third sounding beam with the parametric frequency $f_1$ at the difference frequency $f_{01} - f_{u1}$ and the same radiation direction $\phi_1$. In water, a narrow transmitting lobe propagates in the direction $\phi_1$ at the parametric frequency $f_1$, as is indicated schematically in FIG. 1, at the left-hand side.

After a stepping time determined by the frequency of the clock pulse generator 38 and equal to 2 ms in the illustrated embodiment, the binary counter 22 is advanced by one step. At the output of the binary counter 22 there now appears information identifying the second beam axis direction $\phi_2$ which, initially ignoring the influence of adder stage 23 to be explained below, is again present at the first address inputs 20 and 21 of the two PROMs 18 and 19 as well as at the inputs of the scale adaptation devices 26 and 27. The latter emit a frequency information which, in the case of the scale adaptation device 26 is $f_{02}$ and in the case of the scale adaptation device 27 is $f_{u2}$. This frequency information is also present at the second address inputs 24 and 25, respectively, of the PROMs 18 and 19 as well as at the control inputs of the clock pulse generators 32 and 33.

The process described above for the directional angle $\phi_1$ is then repeated in the same manner so that now a primary sounding beam at the frequency $f_{02}$ and a primary sounding beam at the frequency $f_{u2}$ are emitted simultaneously via the transducer arrangement 14 at the directional angle $\phi_2$, to result in the third sounding beam at the difference frequency $f_2$ and with the same propagation, or radiation, direction $\phi_2$.

Thereafter, the binary counter 22 is advanced by a further step in response to a further clock pulse from the clock pulse generator 38 so that at its output there is now provided information identifying the third beam axis direction $\phi_3$. The same process is repeated and the transducer arrangement 14 generates in the water a third beam at the parametric frequency $f_3$ and at the direction angle $\phi_3$.

At the completion of the eighth clock pulse step of the clock pulse generator 38, producing a resultant sounding beam at the difference frequency $f_8$ and in the direction $\phi_8$, a control pulse appears at the carry output of the binary counter 22 to signal the end of the transmission sequence. The synchronizing device 46 then produces a signal which blocks the binary counter 22 and the two PROMs 18 and 19, and at the same time activates the signal processing device 45.

The echoes subsequently received by the transducers or transducer groups 13 of the transducer arrangement 14 reach the summing member 39 via the individual elements 15 and are there added time serially and amplified in amplifier 40 to be fed to the filter bank 41. Then the echoes are fed to the echo logic 43 via separate channels according to their frequencies and are there converted in a known manner to distance or depth values. As echo logic 43 may be used known display-units of echo sounders, e.g. an echo recorder for each separate channel.

If, for example, the parametric sounding beam or sounding pulse emitted at the direction $\phi_3$ impinges on an object and is reflected therefrom, the transducer arrangement 14, which is omnidirectional with respect to its receiving function, receives, inter alia, an echo signal at the frequency $f_3$. This echo signal travels, via the bandpass filter tuned to the frequency $f_3$ in filter bank 41, to the echo logic 43, which also receives information regarding the time of emission of the corresponding scanning beam, so that the distance or depth value determined here on the basis of the travel time of the incoming echo is associated without difficulty with the direction $\phi_3$ and is represented by an expression or displayed on a depth value display together with information identifying the direction $\phi_3$. The transmitting angle swept by the transmitter, in this embodiment corresponding to the angle sector 10 of, for example, 32°, can thus be accurately resolved down to increments of 4° and the directions of objects lying within this transmitting angle range from the arrangement 14 can be determined very accurately.

In order to enlarge the transmitting angle range and correspondingly the receiving angle range, the circuit arrangement according to FIGS. 3 and 5 includes, on the one hand, the adder stage 23 between the output of the binary counter 23 and the first address inputs 20 and 21 of the PROMs 18, 19 and, on the other hand, a direction forming system 47 in the receiving portion 17 with which a number of preformed beams (PFB) are generated which simultaneously cover the entire receiving angle range. The direction forming system 47 is connected between the elements 15 and the signal processing system. In correspondence with the number of desired primary lobes or PFB, an identical number, here three, of signal processing devices 45, 45' and 45" must then likewise be provided in the signal processing system. Each one of the signal processing devices 45, 45' and 45" corresponds in structure to that described in connection with FIG. 4.

The direction forming system 47 which serves to directionally pre-equalize the received signals is provided with a plurality of time delay members 48, 49, 50. Corresponding to the existing number of signal processing devices 45, 45' and 45", each transducer or each transducer group 13, respectively, is connected with a respective series connection of three time delay members 48, 49 and 50. All outputs of the first delay members 48 in the series connections are connected with the inputs of signal processing device 45, all outputs of the second time delay members 49 in the series connections are connected with the inputs of signal processing device 45' and all outputs of the third time delay members 50 in the series connections are connected with the inputs of signal processing device 45". By assigning suitable delay times to the individual time delay members 48, 49 and 50, the direction forming system 47 causes the transducer arrangement 14 which operates as the receiver base to effectively have three simultaneous primary receiving lobes or PFB, each PFB completely covering one of the angle sectors 10, 11 or 12 shown in FIG. 2. In this way, the parametric frequencies are no longer received almost omnidirectionally, as was the case in the embodiment according to FIGS. 3 and 4, but rather a concentrated receiving system with three receiving PFB is realized with which an angular range can be covered that is three times as large as in the embodiment according to FIGS. 3 and 4.

The time constants $\tau_{11}$ to $\tau_{n1}$, $\tau_{12}$ to $\tau_{n2}$ and $\tau_{13}$ to $\tau_{n3}$ of the delay members 48, 49 and 50 are selected in known manner based on the distance d of the transducers or transducer groups 13—against each other—and the chosen direction $\theta$ of PFB. For linear arrays with constant transducer distances the time constants are $$\tau_{n1,n2,n3} = n \cdot \frac{d}{c} \cdot \sin \theta_{1,2,3},$$

where n is the number of transducers, c the speed of sound in water and $\theta_{1, 2, 3}$ the direction of PFB's in the sectors 10, 11, 12.

Reverting to FIG. 3, the second input of the adder stage 23 is connected to an output of the synchronizing device 46. By suitably designing the synchronizing device 46, e.g. by providing a further binary counter not shown here, angle information is likewise fed to the second input of the adder stage 23. This information is characteristic for the angle sector 10, 11 or 12.

If, for example, the angle information fed to the second input of the adder stage 23 corresponds to the sum of the individual angles covered by the directions $\phi_1$ to $\phi_8$, i.e. to the entire angle subtended by the angle sector 10, shown in FIGS. 1 and 2, then the information appearing at the output of the adder stage 23 represents an angular extent which is larger, by an amount equal to the angle subtended by sector 10, than the angular direction information at the other input of the adder stage 23, which other input is connected, as described above, with the binary counter 22.

The operation of this circuit arrangement is as described in connection with FIGS. 3 and 4 with the sole exception that now the information, present at inputs 20 and 21 of the PROMs 18 and 19 does not solely identify direction $\phi_1$ but rather a direction which has been pivoted by the angle subtended by the angle sector 10. As a result, a parametric frequency $f_1$ is generated in the angle sector 11 in a direction corresponding to direction $\phi_1$. In the same way as described above, scanning beams at the parametric frequencies $f_2$ and $f_8$ are generated in the angle sector 11 at the directions corresponding to $\phi_2$ to $\phi_8$.

If the adder stage 23 then receives, via its second input, an additional directional angle information signal which corresponds to a further value of the opening angle of the angle sector 10, this information is added to the directional information present at the first input of the adder stage 23. In this case, a parametric frequency $f_1$ for example, is not generated, as described above, at the direction $\phi_1$ in the angle sector 10, but rather at the corresponding direction in the angle sector 12. All parametric frequencies $f_1$ to $f_8$ thus appear three times, each at three different directions which are each pivoted with respect to one another by the opening angle of the angle sector 10. The resulting ambiguity of each parametric frequency signal is suppressed at the receiving end by the already described PFB since they differently pre-equalize with respect to direction the received signals associated with the individual angle sectors 10 through 12 so that in each one of the signal processing devices 45, 45' and 45" each of the parametric frequencies $f_1$ through $f_8$ can appear only once.

The switching from one angle sector 10, 11 or 12 to the other is preferably effected in response to each control pulse at the carry output of the binary counter 22. The first control pulse at the carry output of the binary counter 22 occurs after eight clock pulses. Until then, the operation of the circuit arrangement according to FIGS. 3 and 5 is the same as that described in connection with FIGS. 3 and 4.

In the angle sector 10, parametric frequencies $f_1$ to $f_8$ are generated in beams at the associated directions $\phi_1$ to $\phi_8$. The echoes originating from this angle sector 10 are directionally received via the PFB covering the angle sector 10 at the receiving end and are fed to the signal processing device 45 which operates in the above-described manner.

Upon occurrence of the first control pulse at the carry output of the binary counter 22, additional directional information is fed to the second input of the adder stage 23 from the synchronizing device 46 and this additional directional information corresponds to the opening angle of the angle sector 10. At the same time the binary counter 22 is reset via the synchronizing device 46 and the above-described process is repeated with the difference that now, because of the changed directional angle information at the inputs 20 and 21 of the PROMs 18 and 19, respectively, parametric frequencies $f_1$ to $f_8$ are generated in succession in the angle sector 11. The echoes originating from radiation in this angle sector 11 are received directionally by the PFB covering the angle sector 11 at the receiving end and are fed to the signal processing device 45'.

After eight further clock pulse steps of the clock pulse generator 38, a further control pulse appears at the carry output of the binary counter 22 to cause the synchronizing device 46, in addition to again resetting the binary counter 22, to feed information identifying an additional directional angle, which corresponds to twice the opening angle of the angle sector 10, to the second input of adder stage 23. In this way the process of generating successive beams at different parametric frequencies is now repeated in the angle sector 12. The echoes originating from angle sector 12 are directionally received via the third PFB and fed to the signal processing device 45''.

By using the direction forming system 47 with its three PFB it is thus possible to cover a transmitting and receiving region whose angular extent is equal to the opening angle of the angle sector 10 multiplied by the number of, here three, PFB. The processing of the received signals in the three signal processing devices 45, 45', and 45'' is identical with that described in connection with the embodiment according to FIGS. 3 and 4.

The present invention is not limited to the abovedescribed embodiments of a circuit arrangement. For example, instead of employing analog signal processing in the signal processing devices 45, 45' and 45'', the received signals may be processed digitally. The filter bank 41 could then be replaced, for example, by an FFT processor (Fast Fourier Transformation processor), as disclosed e.g. in the U.S. Pat. No. 4,271,412.

It is further not obligatory to add the upper and lower frequencies of the two sounding beams in a mixer 36 and to transmit them together over the same transducer or the same transducer group 13. Instead separate transducers or transducer groups 13 could be provided for the sound radiation at the upper frequency and the sound radiation at the lower frequency, these transducers or transducer groups being arranged in the transducer arrangement according to a certain pattern. One half of all transducers or transducer groups 13 then emits sound radiation at the upper frequency, while the other half emits sound radiation at the lower frequency. It is possible just as well to use separate transducer arrangements 14 as the transmitting and receiving bases.

It will be understood that the above description of the present invention is susceptible to various modifications, changes and adaptations, and the same are intended to be comprehended within the meaning and range of equivalents of the appended claims.

What is claimed is:

1. In a circuit arrangement for transmitting and receiving sonic energy, including transmitting means composed of a plurality of transducer units for radiating two directional primary sonic energy beams having substantially coextensive main axes and respectively different frequencies into a medium capable of producing nonlinear acoustic effects to produce a third sonic energy beam having a main axis extending in a given direction and having a frequency equal to the difference between the frequencies of the primary beams, and receiving means for receiving echo signals produced by reflections of the third sonic energy beam, the improvement wherein:

said transmitting means comprise: two memories each associated with a respective primary beam and each having a plurality of outputs, each connected to a respective transducer unit, first address inputs connected to receive information identifying the direction of its associated primary beam, second address inputs connected to receive information identifying the frequency of the sonic energy of its associated primary beam, a plurality of adjacent clock signal inputs connected to receive respective clock pulse trains such that the frequency of the clock pulse train at one clock signal input is equal to the associated sonic energy frequency and the frequencies of the clock pulse train at the other clock signal inputs differ by a factor of 2 from one clock signal input to the next, each said memory being constructed to provide at its outputs signals at the frequency of the sonic energy of its associated beam and with a constant phase relation between adjacent outputs corresponding to the information supplied to said address inputs and determining the direction of the main axis of the associated beam; and control means connected to said address and clock signal inputs of said memories for supplying thereto information and clock pulse signals causing the direction of the main axes, and the frequency difference between, the two primary beams to vary in discrete steps for correspondingly varying the direction of the axis of the third beam over at least one selected angular sector and the frequency of the third beam such that each direction of the third beam axis is associated with a respectively different frequency.

2. Circuit arrangement as defined in claim 1 wherein the number of clock signal inputs of each said memory has a value of n and said control means comprise: two n-stage binary counters each associated with a respective memory and having each of its stages connected to a respective clock signal input of its associated memory, each said counter having a count input receiving a clock pulse having a rate equal to $2^n$ times the sonic energy frequency of its associated primary beam.

3. Circuit arrangement as defined in claim 2 wherein said control means further comprise two clock pulse generators each connected to the count input of a respective counter and each producing clock pulses at a frequency which can be controlled in dependence on the beam direction information.

4. Circuit arrangement as defined in claim 3 wherein said control means further comprise a further binary counter having a counting capacity corresponding to the number of discrete steps in which the beam axes vary over the angular sector and having a counting output connected to said first address inputs of said two memories and, respective scale adaptation devices connected between the counting output of said further counter and control inputs of said two clock pulse generators.

5. Circuit arrangement as defined in claim 4 wherein said second address inputs of each said memory are connected with the outputs of a respective one of said two scale adaptation devices.

6. Circuit arrangement as defined in claim 1 wherein said transmitting means further comprise a plurality of mixers each having two inputs each of which is connected to one output of a respective memory, and an output to a respective transducer unit.

7. Circuit arrangement as defined in claim 1 wherein said plurality of transducer units serve to transmit the sonic energy as well as to receive echo signals.

8. Circuit arrangement as defined in claim 7 wherein said receiving means comprise a signal processing device which is connected to said transducer units and which includes: a summing member having inputs connected to said transducer units, a filter bank connected to the output of said summing member and composed of a plurality of narrowband bandpass filters corresponding in number to the number of beam axis directions in the angular sector and each directional angle having a frequency passband which is tuned to a respective frequency of the third beam.

9. Circuit arrangement as defined in claim 8 wherein there are at least two said signal processing devices and said receiving means further comprise a direction forming system for directionally pre-equalizing the received echo signal connected between said transducer units and said signal processing devices.

10. Circuit arrangement as defined in claim 9 wherein: said direction forming system comprises a plurality of time delay units each composed of a series arrangement of at least two time delay members; each said transducer unit is connected to one said time delay unit, and each said signal processing device is connected to the output of a respective member of each said time delay unit.

* * * * *